United States Patent [19]

Wagner et al.

[11] Patent Number: 5,533,233
[45] Date of Patent: Jul. 9, 1996

[54] SPRING HINGE

[75] Inventors: Reiner Wagner, Ispringen; Otto Lehnert, Sinsheim, both of Germany

[73] Assignee: OBE-Werk Ohnmacht & Baumgärtner GmbH & Co., KG, Ispringen, Germany

[21] Appl. No.: 279,774

[22] Filed: Jul. 25, 1994

[30]  Foreign Application Priority Data

Apr. 30, 1994 [DE] Germany .......................... 44 15 308.2

[51] Int. Cl.⁶ .................................................. G02C 5/22
[52] U.S. Cl. .............................. 16/228; 351/113; 351/153
[58] Field of Search .............................. 16/228; 351/113, 351/153

[56]      References Cited

U.S. PATENT DOCUMENTS 2,976,766  3/1961  Bianchi ..................................... 16/228
4,534,628  8/1985  Morel ....................................... 351/153
5,018,242  5/1991  Guy et al. ................................. 16/228
5,115,540  5/1992  Delorme .................................... 16/228

FOREIGN PATENT DOCUMENTS 0003928  9/1979  European Pat. Off. ............... 351/153
2535070  4/1984  France ................................. 351/153
2126898  11/1972 Germany .............................. 351/113
2268282  1/1994  United Kingdom .................... 16/228

Primary Examiner—M. Rachuba
Assistant Examiner—Donald M. Gurley
Attorney, Agent, or Firm—Anderson Kill Olick & Oshinsky

[57]          ABSTRACT

A spring hinge including a hinge member with a spring member mounted on the hinge member, and a housing for receiving the hinge and spring members, and having an abutment against which the spring member is supported and which insures preloading of the spring member and its retaining, together with the hinge member, in the hinge housing.

11 Claims, 2 Drawing Sheets

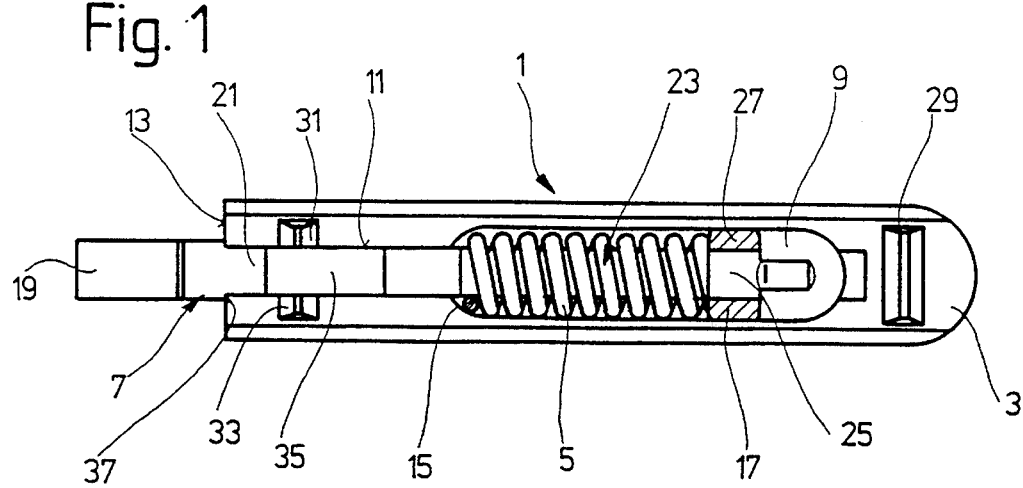
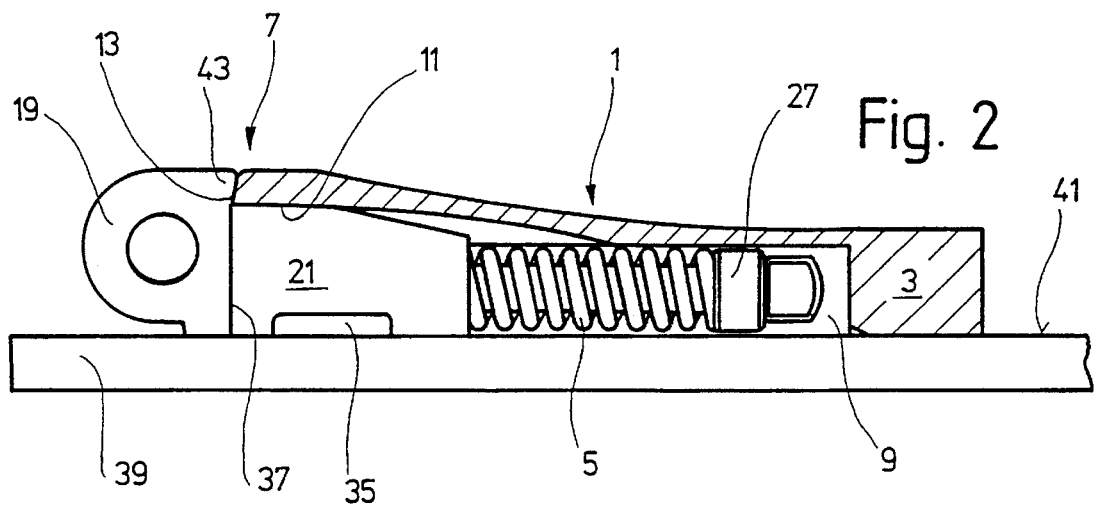
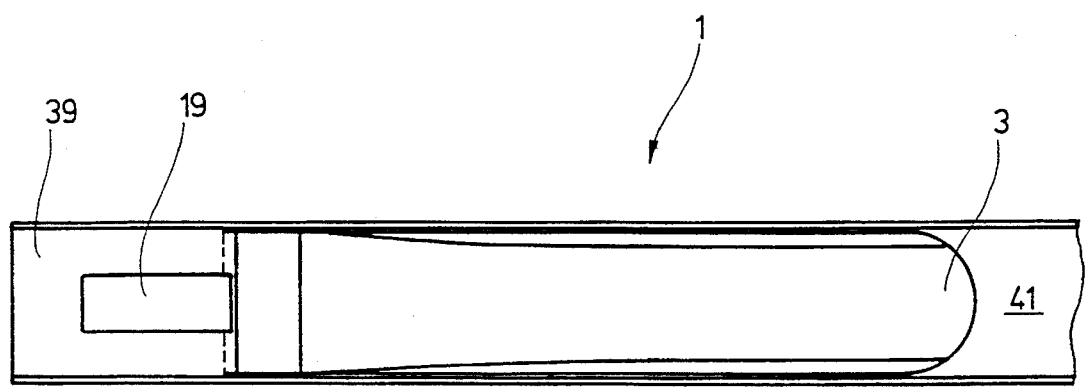

SPRING HINGE

BACKGROUND OF THE INVENTION

The present invention relates to a spring hinge for spectacles and which includes cooperating hinge and spring members located in the hinge housing.

The spring hinges of this type are used in spectacles in which the spectacles' bow is brought from a folded position to an unfolded wearing position and can be displaced outwardly in the unfolded position. The spring hinge insures reliable retaining of the spectacles on the head of the spectacles wearer.

When the spring hinge of this type is used, its housing is soldered to the spectacles bow, and the soldering temperatures are so high that it is necessary for the spring element to be separated from the housing. This results in that the hinge and spring member are mounted in the hinge housing after it is soldered to the bow. Mounting of the hinge and spring elements in the hinge housing after its soldering to the spectacles bow complicates the assembly of the spring hinge with the spectacles and increases costs.

Accordingly, the object of the invention is a hinge spring of the above-described type the assembly of which, with the spectacles, is simplified.

SUMMARY OF THE INVENTION

This and other objects of the present invention, which will become apparent hereinafter, are achieved by providing in the hinge housing an abutment, against which the spring member is supported and which insures preloading the spring member, upon its placement in the housing, and retaining the spring member therein.

Advantageously, the abutment is formed as a part of the housing, namely, by providing a housing wall having a portion of increased thickness which defines the abutment. This region can serve for conducting current during electrowelding of the housing to the spectacles bow. In this case, the thinner wall region would not be substantially thermally loaded, and that prevents undesired deformation.

It is especially advantageous when the hinge member and the spring member are pre-assembled to form an integral structural component which is then mounted in the hinge housing. This reduces a number of parts which has to be dealt with during manufacturing of the spring hinge and significantly simplifies the manufacturing process.

It is further advantageous when the hinge housing is provided with welding studs, which insure a quick and simple welding of the hinge housing to the bow. The advantages of the welding of the housing to the spectacles bow consists in that the welding process is very simple and in that a cleaning step, which is required when a housing is soldered to the spectacles bow, is eliminated.

BRIEF DESCRIPTION OF THE DRAWINGS

The features and objects of the present invention will become more apparent, and the invention itself will be best understood from the following detailed description of the preferred embodiments, when read with reference to the accompanying drawings, wherein:

FIG. 1 shows a bottom view of a spring hinge, according to the present invention, before its mounting on a the spectacles;

FIG. 2 shows a partially cross-sectional view showing a spring hinge, according to the present invention, in a mounted condition thereof on a spectacles bow;

FIG. 3 shows a plan view of the spring hinge shown in FIG. 2;

DETAILED DESCRIPTION OF THE PREFERRED EMBODIMENT

Figure 4:
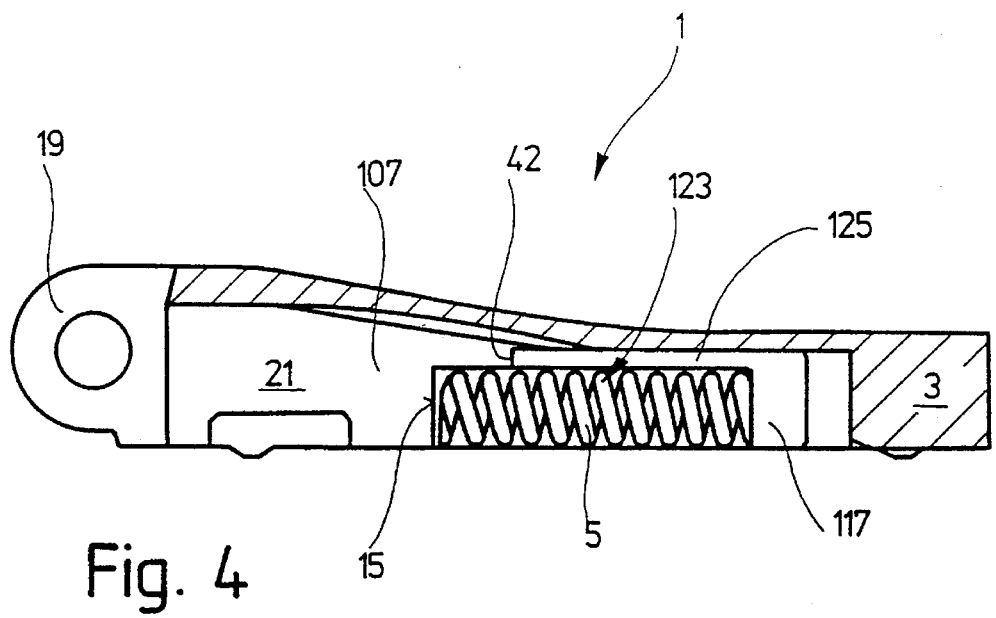
FIG. 4 shows a longitudinal, partially cross-sectional view of another embodiment of a spring hinge, according to the present invention.

A spring hinge, according to the present invention, which is shown in FIG. 1, includes a housing 3 and located therein hinge member 7 with a spring member 5 mounted thereon. The housing 3 is provided with a cavity 9, which is located to the right of a channel 11 extending through the end surface 13 of the housing 3. The cavity 9 has a width which is greater than the width of the channel 11. The transition region between the channel 11 and the cavity 9 forms an abutment 15 against which the spring member 5 is supported. The width of the spring member 5 corresponds to that of the cavity 9. The abutment 15 serves as a first support shoulder for the spring member 5. The end of the spring member 5, which is opposite to that supported against the abutment 15, is supported against a second support shoulder 17.

The distance between the abutment 15 and the shoulder 17 is so selected that the spring member 5, in an assembled position thereof in the housing 3, is preloaded. The preloading of the spring member 5 insures that all parts located in the housing 3 are securely held therein. Because of this, conventional locking means, which are usually used for retaining parts of a spring hinge in the hinge housing, can be dispensed with. Thereby, assembly of the spring hinge is substantially simplified. This substantially reduces costs associated with manufacturing of a spring hinge and its mounting on the spectacles bow. The reduction of costs also results from fewer parts used in a spring hinge according to the present invention.

The hinge member 7 is longitudinally displaceable in the housing 3. The hinge member 7 is biased by the spring member 5 to the right of the drawing of FIG. 1 so that a gudgeon 19, which forms the bow hinge, is also so biased. The hinge member 7 has a guide portion 21 which is located in the channel 11, and a support portion 23 for supporting the spring member 5 and which is formed as a continuation of the guide portion 21.

In the embodiment shown in FIG. 1, the spring member 5 is formed as a helical spring through which a pin 25, defining the support portion 23, extends. An annular member or ring 27 which defines the shoulder 17, is secured to an end of the pin 25 remote from the guide portion 21. This remote end of the pin 25 is so deformed, preferably flattened, that the ring 27 would not slide outwardly. Fixed mounting of the ring 27 on the end of the pin 25 provides for preloading of the spring member 5 between the abutment 15 and the shoulder 17 defined by the ring 27.

The housing 3 has on a bottom side thereof, shown in FIG. 1, projections 29, 31 and 33 which serve as welding studs. The single projection 29, which extends, as shown in FIG. 1, substantially transverse to the longitudinal extent of the hinge housing 3, can be divided in several projections. The projection 29 is located to the right of the cavity 9, at a portion of the housing 3 which has a relatively larger wall thickness.

The projections 31 and 33 are located immediately adjacent to the channel 11. Because the width of the channel 11 is, as it has already been discussed previously, smaller than that of the cavity 9, the housing wall in the region of the projections 31 and 33 is also sufficiently thick.

The so-formed housing 3 is adapted for being connected to the spectacles bow by electrowelding, preferably by spot welding, during which the current passing through the housing 3 is so high that the projections 29, 31 and 33, arranged on the metallic bow of the spectacles, are heated to a very high degree so that the welding of the housing 3 to the bow is insured.

In the region of the projections 31 and 33, the guide portion 21 of the hinge member 7 has a recess which is formed as a groove 35 extending across the width of the guide portion 21. The groove 35 is designed for receiving the melted material which results from melting of the projections 31 and 33, so that the movability of the guide portion 21 in the channel 11 of the housing 3 is not affected by welding of the housing 3 to the spectacles bow.

FIG. 1 shows that the hinge member 7 in the region of the gudgeon 19 is wider than in the region of the guide portion 21, the width of which substantially corresponds to that of channel 11, so that a shoulder 37 is formed. The shoulder 37 abuts the end surface 13 of the housing 3. The shoulder 37 limits rightward displacement of the hinge member 7. However, the shoulder 37 provides for secure retaining of the hinge member 7 in the housing 3 and insures that the spring hinge constitutes an integral unit that can be mounted on, preferably welded on the spectacles bow.

FIG. 2 shows an elevational view of the spring hinge 1 shown in FIG. 1. The spring hinge 1 is shown in a position in which it is welded to the spectacles bow 39, with the housing 3 lying on the upper surface 41 of the bow 39. From FIG. 2 which shows a side view of the hinge member 7 and the spring member 5, it is apparent that the height of the guide portion 21 corresponds to the depth of the channel 11. Thereby, the upper surface of the guide portion 21 slides along the wall of the channel 11, and the bottom surface of the guide portion 21 slides along the upper surface 41 of the bow 39. The groove 35 in the bottom surface of the guide portion 21 is clearly visible in FIG. 2.

For improving the displacement of the hinge member 7 in the housing 3, the height or the diameter of the spring member 7 can also be advantageously selected so that it corresponds to the height or depth of the cavity 9. The same consideration is applied to the ring 27, the diameter of which is so selected that its peripheral surface slides along the top surface of the cavity 9 and the upper surface 41 of the spectacles bow.

It is further provided that the width of the guide portion 21 corresponds to that of the channel 11, and the width or diameter of the spring member 5 and the width or diameter of the ring 27 corresponds to the width of the cavity 9. These correspondences insure an optimal displacement of the hinge member 7 in the housing 3.

FIG. 2 also shows that the end surface 13 of the housing 3 has an upper portion which is inclined toward the rear and that the gudgeon 19, which has a shoulder 37 flatly abutting the end surface 13, has a nose portion 43 which engages the rearward inclined portion of the end surface 13. The engagement of the nose portion 43 with the upper portion of the end surface 13 additionally provides for reliable retention of the hinge member 7 in the housing 3, as the hinge member 7 is retained in the housing 3 not only by frictional forces but also by a form-locking connection.

Because the gudgeon 19 is pressed against the end surface 13 of the housing 3 due to action of the spring member 5, the housing interior, that is the channel 11 and the cavity 9, are protected from contamination.

FIG. 3 shows a plan view of the spring hinge shown in FIGS. 1 and 2. In FIG. 3, the elements identical with those shown in FIGS. 1 and 2, are designated with the same reference numerals so that a reference to the already described FIGS. 1 and 2 can be made. FIG. 3 shows that the housing 3 is closed at its upper surface. The housing 3 is also closed at its side surfaces.

Another embodiment of a spring hinge, according to the present invention, is shown in FIG. 4. In FIG. 4 the elements similar also to those of FIGS. 1 and 2 are designated with the same reference numerals.

In FIG. 4, the spring-receiving portion 123 of the hinge member 7 is defined by a receiving clip 125 having a support shoulder 117 against which the spring member 5 is supported. As in FIG. 1, the opposite end of the spring member 5 is supported against the abutment 15, which is formed by the guide portion 21.

The distance between the abutment 15 and the shoulder 117 is less than the length of the spring member 5 in its unloaded condition. As a result, the spring member is preloaded, when placed between the abutment 15 and the shoulder 117, and is retained by frictional forces. It is also possible to provide the support surfaces, against which the spring member 5 is supported, with projections to additionally obtain a form-locking connection. When the spring member 5 is formed as a helical spring, these projections can easily engage into the interior of the helical spring for reliable retention of the spring in the spring-receiving portion 123.

Due to the retention of the spring member 5 in the clip 125, the hinge member 107 has a very simple structure. The hinge member 107 may be formed as a one-piece part consisting of the gudgeon 19, the guide portion 21, and the receiving clip 125, which makes the mounting of the hinge member 7 in the housing 3 very simple and cost-effective.

FIG. 4 also shows that the width of the receiving clip 125 is not constant along its length. The clip 125 can be provided with a projection 42 that would limit the displacement of the spring member 107 in the housing 3 by engaging a respective stop surface of the housing 3.

The guide portion 21 of the hinge member 107 has, in the region of the clip 125, a width corresponding to that of the clip 125 which has a width greater than that of the guide portion 21 only in the region of the projection 42. The projection 42, when viewed in the axial direction of the spring hinge 1, is displaced rightward with respect to the abutment 15.

Figure 5:
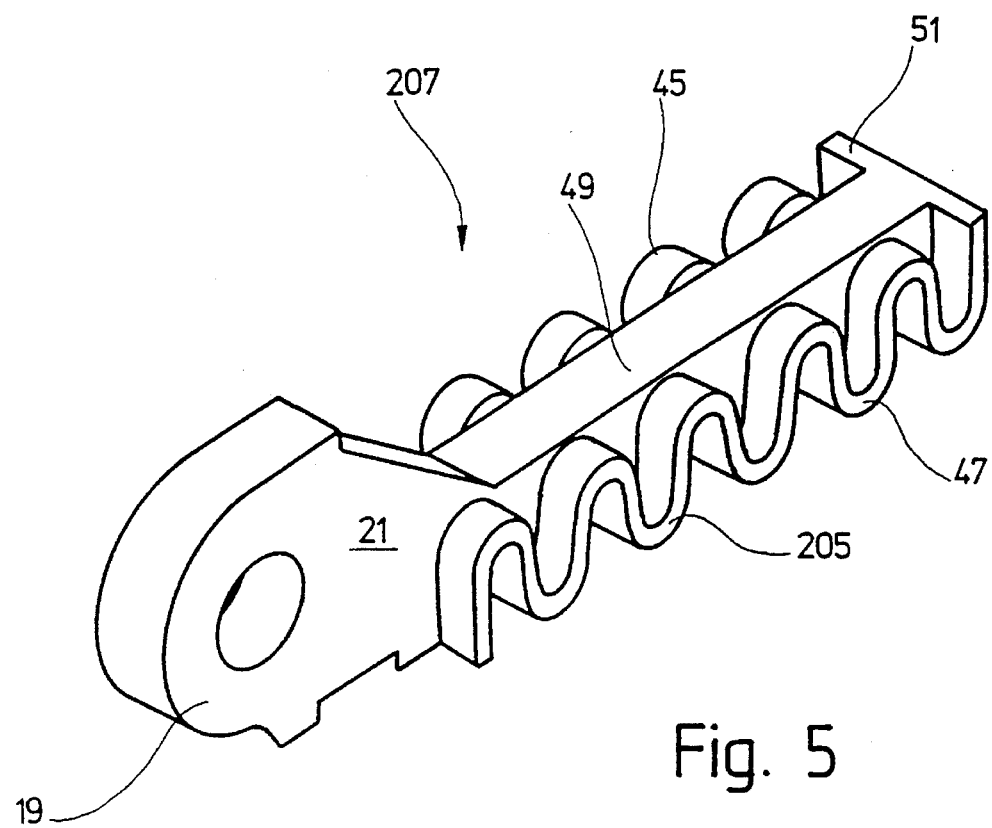
FIG. 5 shows a perspective view of a hinge member of a spring hinge, according to the present invention.

FIG. 5 shows yet another embodiment of the hinge member of the spring hinge, according to the present invention. The hinge member 207, shown in FIG. 5, is formed as a one-piece part including a gudgeon 19, a guide portion 21, and a spring member 205. The spring member 205 is formed of two spring portions 45 and 47, having a meander shape, and arranged on opposite sides of an extension 49 extending between the guide portion 21 and an end plate 51, to which the meander spring portions 45 and 47 are attached.

The total width of both spring portions 45 and 47 and the extension 49 is so selected that the spring member 205 can be arranged in the cavity 9 of the hinge housing 3, shown in FIG. 1. The height or depth of the guide portion 21 is so selected, in the embodiment of the hinge member 207, that the guide portion 21 can be easily displaced in the channel 11 of the housing 3, shown in FIG. 1.

From FIG. 5 it is apparent that for the functioning of the spring hinge 1, it is of no importance how the spring member is formed and how it is connected with the hinge member. The important thing is that the spring member is preloaded, and the hinge member is spring-biased against the hinge housing but with a possibility of at least limited displacement in the longitudinal direction of the spring hinge.

It is further important that the spring hinge is formed as a unitary assembly before it is mounted on the spectacles bow, with the hinge and spring members being secured in the hinge housing. From the foregoing description, it should be apparent that the spring and hinge members can be formed as a unitary structural component, e.g., as a one-piece part, as shown in FIG. 5. When the hinge and spring members are formed as a one-piece part, an operation of assembling of the spring and hinge members is eliminated, which leads to further reduction in manufacturing costs.

Advantageously, the hinge member is formed of metal. However, it is also possible to form the hinge member of a special plastic material and other materials which can absorb the generated tensile forces acting on the hinge member and the spring hinge.

The housing 3 of the spring hinge is formed of metal. The cavity 9 and the channel 11 are formed either simultaneously with the forming of the housing itself, e.g., during casting or sintering process, or preferably, by machining after the housing is formed. At that, the width and depth of the cavity 9 and the channel 11 should be so selected that they correspond to those of members located therein.

Further, the thickness of the housing wall in the region of welding studs or projections 29, 31 and 33 should be greater than, for example, that of the wall portions adjacent to the cavity 9, and definitely greater than the thickness of sheet metal from which the housings of conventional spring hinges are formed. Because of the increased wall thickness of the housing 3, the strength of the welding current can be optimally selected so that it insures melting of the projections 29, 31 and 33 and thus, reliable mounting of the spring hinge on the spectacles bow.

The thickness of the other wall portions of the housing of the spring hinge, according to the present invention, remains substantially the same as in conventional spring hinges. The welding process is effected so rapidly that excess heating of the elements located in the housing is avoided. The absence of excess heating of the spring member prevents annealing, e.g., of the helical spring, when it is used as a spring member.

It is this advantage of the spring hinge, according to the invention, that permits it forming as a unitary assembly, with the hinge and spring members being placed in the housing before its mounting on the spectacles bow.

The use of the above-described welding technique permits utilization of nickel-free materials which are generally preferred, because presence of nickel can cause allergic reactions in some spectacles wearers. The hinge member 1 of the spring hinge, according to the present invention, can be made of titanium, especially if it is to be mounted on a titanium bow.

The spring hinge, according to the present invention, is also characterized in that locking means for locking the hinge member in the housing can be eliminated. This is made possible by providing, according to the invention, an abutment in the hinge housing against which the spring member is supported. The elimination of the locking means reduces the number of parts for a spring hinge and facilitates its manufacture, thus leading to reduction in costs.

While the present invention is shown and described with reference to preferred embodiments, various modifications thereof will be apparent to those skilled in the art and, therefore, it is not intended that the invention be limited to the disclosed embodiments or details thereof, and departures may be made therefrom within the spirit and scope of appended claims.

What is claimed is:

1. A spring hinge for spectacles, comprising hinge means including a spring member; and a housing for receiving said hinge means, said housing having means for preloading and retaining said spring member in said housing, said preloading and retaining means comprising an abutment against which said spring member is supported, wherein said abutment is defined by a portion of a wall of said housing having an increased thickness in comparison with a thickness of an adjacent wall portion of said housing wall, wherein said hinge means include a hinge member forming with said spring member an integral structural component received in said housing, and wherein said housing has projections which serve as welding studs, and said hinge member has a guide portion provided with a recess which, when said hinge member is received in said housing, is located in a region of said projections.

2. A spring hinge as set forth in claim 1, wherein said housing has a channel for receiving said hinge member and a cavity for receiving said spring member, wherein said cavity is a continuation of said channel and has a width exceeding a width of said channel, whereby a said increased thickness portion is formed.

3. A spring hinge as set forth in claim 1, wherein said housing has projections which serve as welding studs.

4. A spring hinge as set forth in claim 1, wherein said hinge member has a portion for receiving said spring member thereon.

5. A spring hinge as set forth in claim 4, wherein said receiving portion of said hinge member has a shoulder support thereon against which said spring member is supported.

6. A spring hinge as set forth in claim 5, wherein said shoulder support is integral with said receiving portion.

7. A spring hinge as set forth in claim 5, wherein said spring member is a helical spring, and said receiving portion of said hinge member is formed as a pin extending through said helical spring.

8. A spring hinge as set forth in claim 1, wherein said spring member is a meander spring.

9. A spring hinge as set forth in claim 1, wherein said hinge member and said spring member are formed as a one-piece part.

10. A spring hinge as set forth in claim 1, wherein said recess is formed as a groove.

11. A spring hinge for spectacles, comprising hinge means including a spring member; and a housing for receiving said hinge means, said housing having means for preloading and retaining said spring member in said housing, said preloading and retaining means comprising an abutment against which said spring member is supported, wherein said abutment is defined by a portion of a wall of said housing having an increased thickness in comparison with a thickness of an adjacent wall portion of said housing wall, wherein said hinge means includes a hinge member forming with said spring member an integral structural component received in said housing, and wherein said housing has projections which serve as welding studs.

* * * * *